(12) United States Patent
Bisso, IV

(10) Patent No.: US 7,393,033 B1
(45) Date of Patent: Jul. 1, 2008

(54) SHACKLE

(76) Inventor: William A. Bisso, IV, 11311 Neeshaw Dr., Houston, TX (US) 77665

( * ) Notice: Subject to any disclaimer, the term of this patent is extended or adjusted under 35 U.S.C. 154(b) by 431 days.

(21) Appl. No.: 10/962,173

(22) Filed: Oct. 7, 2004

(51) Int. Cl.
*B66C 1/34* (2006.01)
(52) U.S. Cl. .................. 294/82.1; 294/82.35; 59/86
(58) Field of Classification Search .......... 294/82.34, 294/82.1, 82.11, 82.35; 59/85, 86, 35.1; 278/96; 403/154, 157, 79; 24/115 R
See application file for complete search history.

(56) References Cited

U.S. PATENT DOCUMENTS

| | | | |
|---|---|---|---|
| 417,417 A | 12/1889 | Gedney | |
| 1,719,673 A * | 7/1929 | Rottmer | .................. 59/86 |
| 2,449,593 A | 9/1948 | Drake | |
| 2,909,386 A | 10/1959 | Ramey | |
| 3,958,411 A | 5/1976 | Bernt | |
| 4,068,467 A * | 1/1978 | Schreyer et al. | ............ 59/93 |
| 4,079,584 A | 3/1978 | Shahan | |
| 4,216,987 A * | 8/1980 | Ely | ............ 294/82.35 |
| 4,273,371 A | 6/1981 | Behnke et al. | |
| 4,690,167 A | 9/1987 | Skipper | |
| 4,788,927 A * | 12/1988 | Casey | .................. 114/249 |
| 5,046,881 A | 9/1991 | Swager | |
| 5,114,260 A * | 5/1992 | Hart et al. | .............. 403/24 |
| RE34,046 E | 9/1992 | Shahan | |
| 5,433,547 A * | 7/1995 | Hart et al. | .............. 403/24 |
| 6,023,927 A | 2/2000 | Epstein | |
| D433,617 S | 11/2000 | Gray, Jr. | |
| 6,145,293 A | 11/2000 | Jenkins, Jr. | |

* cited by examiner

*Primary Examiner*—Saul Rodriguez
*Assistant Examiner*—Esther O Okezie
(74) *Attorney, Agent, or Firm*—Garvey, Smith, Nehrbass & North, L.L.C.; Charles C. Garvey, Jr.

(57) ABSTRACT

The present invention provides an improved shackle having particular utility in underwater salvage operations. The present invention discloses a shackle that has a generally U shaped body that is comprised of a bow portion and first and second spaced apart arms. Each arm has an end portion with an opening for receiving a shackle pin. The shackle pin is sized and shaped to simultaneously fit through the shackle pin openings, and end portion of the pin having external pin threads. A nut provides an internally threaded opening for engaging external threads of a shackle pin. The nut is rotatably mounted to a second end portion of the shackle body. The external pin threads of the shackle pin and the internal threads of the nut are engaged when the pin is connected to the nut by rotating the nut. The pin does not rotate relative to the shackle body, due to an elongated groove in the pin that travels on a key portion of the shackle body that is in one of the openings.

40 Claims, 7 Drawing Sheets

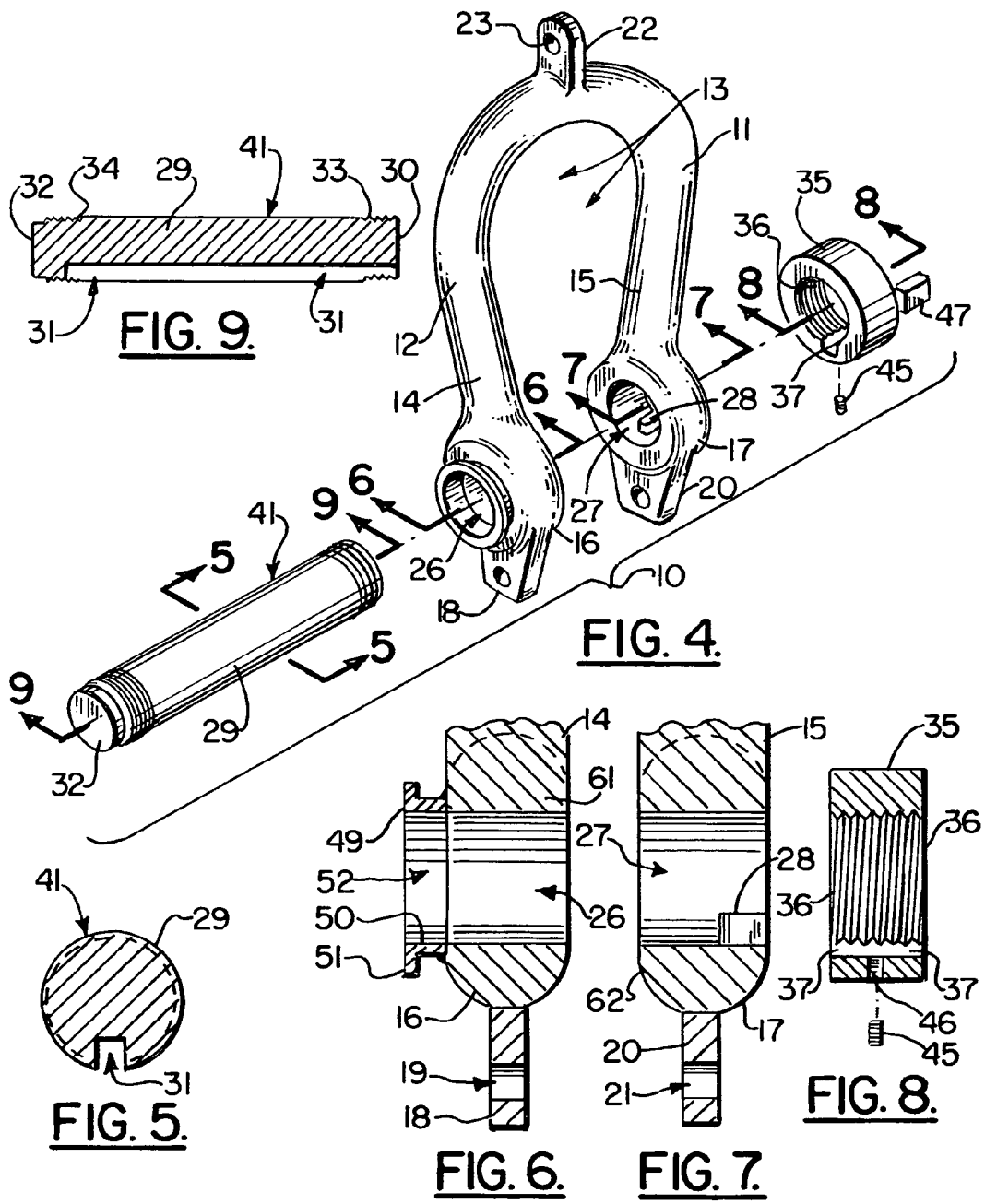

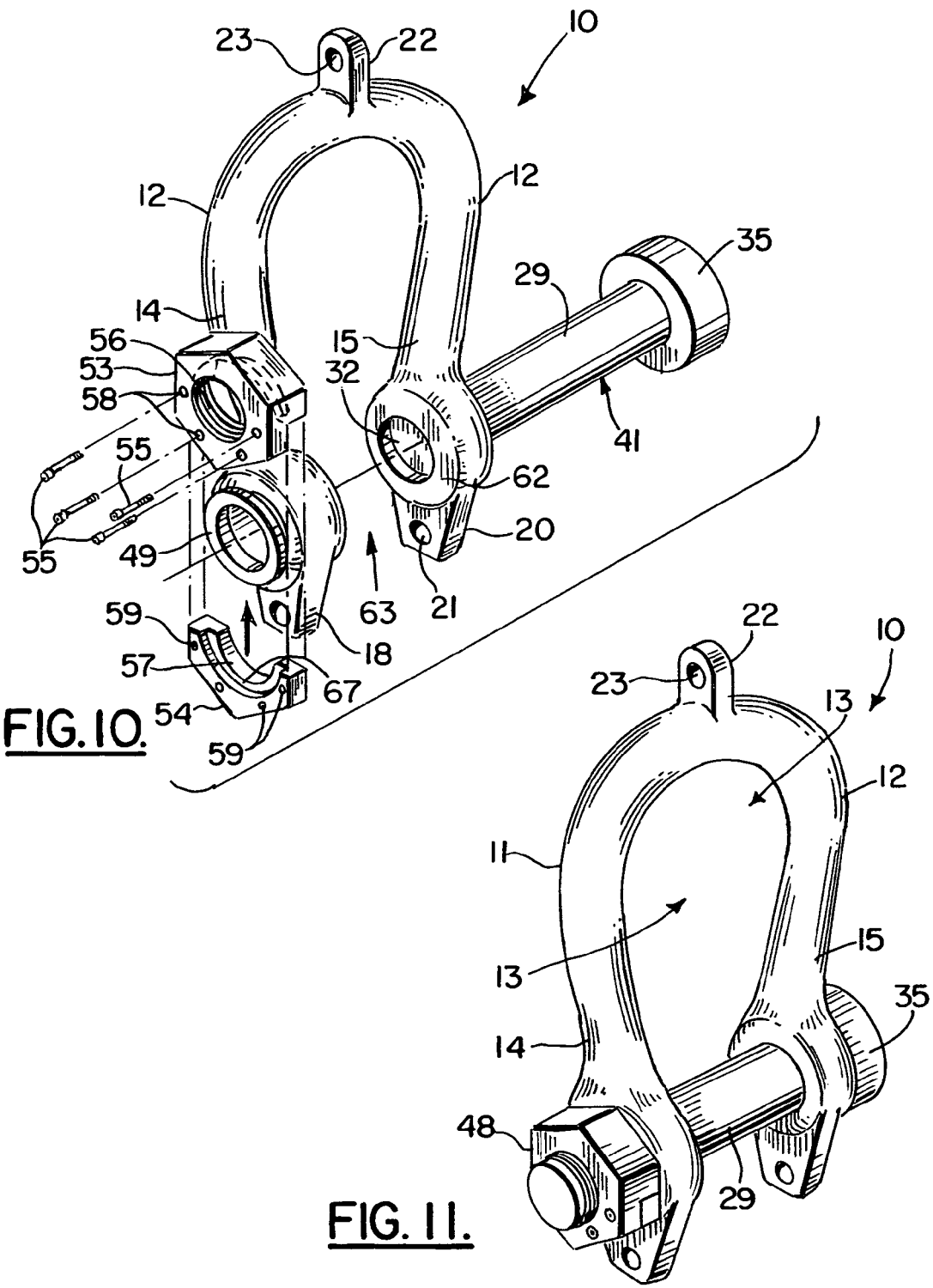

SHACKLE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved heavy duty shackle having particular utility in the salvaging of underwater objets. More particularly, the present invention relates to an improved shackle having a shackle body that is generally u-shaped, a shackle pin that fits openings in the arms of the shackle and wherein a nut is permanently and rotatably attached to the shackle body on one of the arms, the pin being prevented from rotating with respect to the shackle body and wherein a connection of the pin to the nut is achieved by engaging correspondingly shaped threads of the pin and nut and by rotating the nut. When used in an underwater environment, the present invention prevents inadvertent loss of the nut or pin because they are both permanently attached to the body of the shackle.

2. General Background of the Invention

Shackles are commonly used as a part of rigging when lifting very heavy objects. Typically, a lift employs a lifting device such as a crane that has a lift line and a lifting hook. A number of slings can be attached to the crane lifting hook and then extending diagonally to various points of attachment on the load. When salvaging an underwater object such as sunken vessel, boat, ship or the like, divers are employed to attache rigging to selective locations on the vessel to be salvaged. In an underwater environment, it is easy for a diver to drop a part of the shackle rendering the entire apparatus useless.

Shackles that are employed in underwater salvage can be quite massive, having weights in the hundreds of pounds. Such shackles cannot be typically lifted by a diver in an underwater operation without some assistance.

Various shackle constructions have been patented. The following table lists examples of such patents that are directed to shackle constructions.

The following U.S. patents are incorporated herein by reference:

TABLE

| PATENT NO. | TITLE | ISSUE DATE |
| --- | --- | --- |
| 417,417 | Nut-Lock | Dec. 17, 1889 |
| 1,719,673 | Shackle | Jul. 02, 1929 |
| 2,449,593 | Jib Sheet Shackle | Sep. 21, 1948 |
| 2,909,386 | Shackle Means | Oct. 20, 1959 |
| 3,958,411 | Shackle | May 25, 1976 |
| 4,079,584 | Heavy Duty Shackle | Mar. 21, 1978 |
| 4,273,371 | Claw Hook Assembly | Jun. 16, 1981 |
| 4,690,167 | Fireplug Anti-Theft Apparatus | Sep. 01, 1987 |
| 5,046,881 | Lockable Pin and Clevis | Sep. 10, 1991 |

TABLE-continued

| PATENT NO. | TITLE | ISSUE DATE |
| --- | --- | --- |
| Re.34,046 | Heavy Duty Shackle | Sep. 01, 1992 |
| 6,023,927 | Shackle with a Kant Loose Pin | Feb. 15, 2000 |
| 6,145,293 | Safety Shackle | Nov. 14, 2000 |
| Des.433,617 | Chain Shackle with Pin Locking Structure | Nov. 14, 2000 |

BRIEF SUMMARY OF THE INVENTION

The present invention provides an improved shackle having particular utility in underwater salvage operations. The present invention discloses a shackle that has a generally U shaped body that is comprised of a bow portion and first and second spaced apart arms. Each arm has an end portion with an opening for receiving a shackle pin. The shackle pin is sized and shaped to simultaneously fit through the shackle pin openings, and end portion of the pin having external pin threads. A nut provides an internally threaded opening for engaging external threads of a shackle pin. The nut is rotatably mounted to a second end portion of the shackle body. The external pin threads of the shackle pin and the internal threads of the nut are engaged when the pin is connected to the nut by rotating the nut. The pin does not rotate relative to the shackle body, due to an elongated groove in the pin that travels on a key portion of the shackle body that is in one of the openings.

The shackle of the present invention can be securely lifted using the padeyes that are positioned at spaced apart locations on the shackle body.

The shackle can be manipulated by the padeyes independently of a lifting sling while the two remain connected.

The shackle of the present invention can be lifted by the padeyes perfectly level on the horizontal plane with the pin extended.

The shackle of the present invention is well balanced vertically and horizontally with the pin secured or extended.

The shackle pin of the present invention does not have to be manually lifted or otherwise handled to be secured.

The shackle pin and nut can be made out of lightweight material such as titanium to reduce weight to make the shackle of the present invention more worker friendly.

The shackle of the present invention has particular utility in an underwater environment providing a non-detachable pin and a non-detachable nut. Divers often face zero visibility water conditions. The present invention aids tremendously by providing a shackle pin and nut that are attached so that losing either one of them in an underwater environment having zero visibility is eliminated.

The shackle pin and nut of the present invention are attached so that there is never a stop in productivity. The present invention eliminates the need to inventory extra shackle parts.

The present invention eliminates long periods of waiting for a spare pin or nut to be transported to a job site from a distributor or a manufacturer after one is inadvertently dropped.

Because the pin and nut of the shackle of the present invention are attached, the shackle is easy to connect to a padeye in an area having space constraints where overhead assistance is not available to lift the pin into place.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is a partial perspective exploded view of the preferred embodiment of the apparatus of the present invention;

FIG. 5 is a sectional view taken along lines 5-5 of FIG. 4;

FIG. 6 is a sectional view taken along lines 6-6 of FIG. 4;

FIG. 7 is a sectional view taken along lines 7-7 of FIG. 4;

FIG. 8 is a sectional view taken along lines 8-8 of FIG. 4;

FIG. 9 is a sectional view taken along lines 9-9 of FIG. 4;

FIG. 10 is a perspective exploded view of the preferred embodiment of the apparatus of the present invention;

FIG. 11 is a perspective view of the preferred embodiment of the apparatus of the present invention;

DETAILED DESCRIPTION OF THE INVENTION

Figure 1:
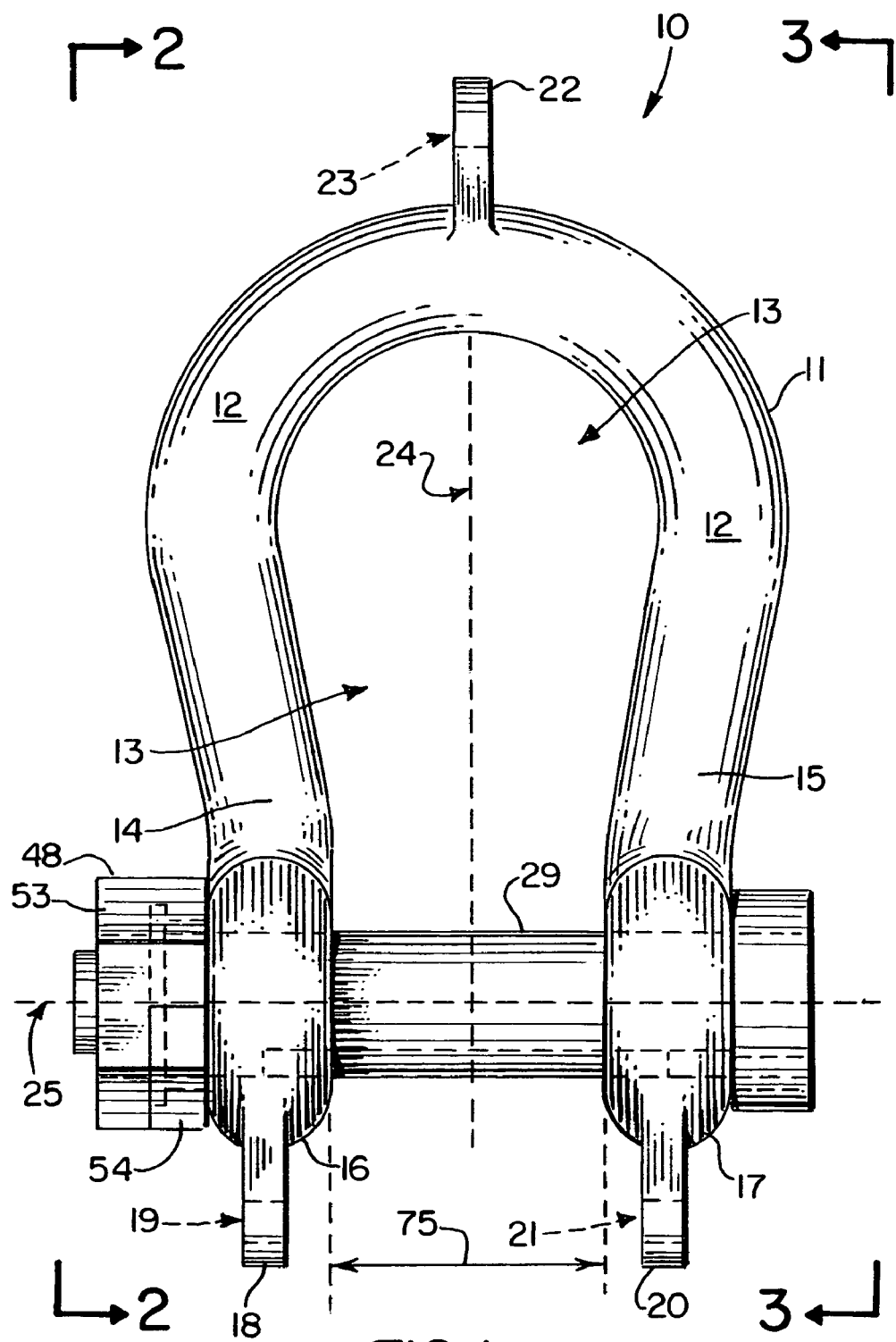
FIG. 1 is an elevation view of the preferred embodiment of the apparatus of the present invention.
Figure 2:
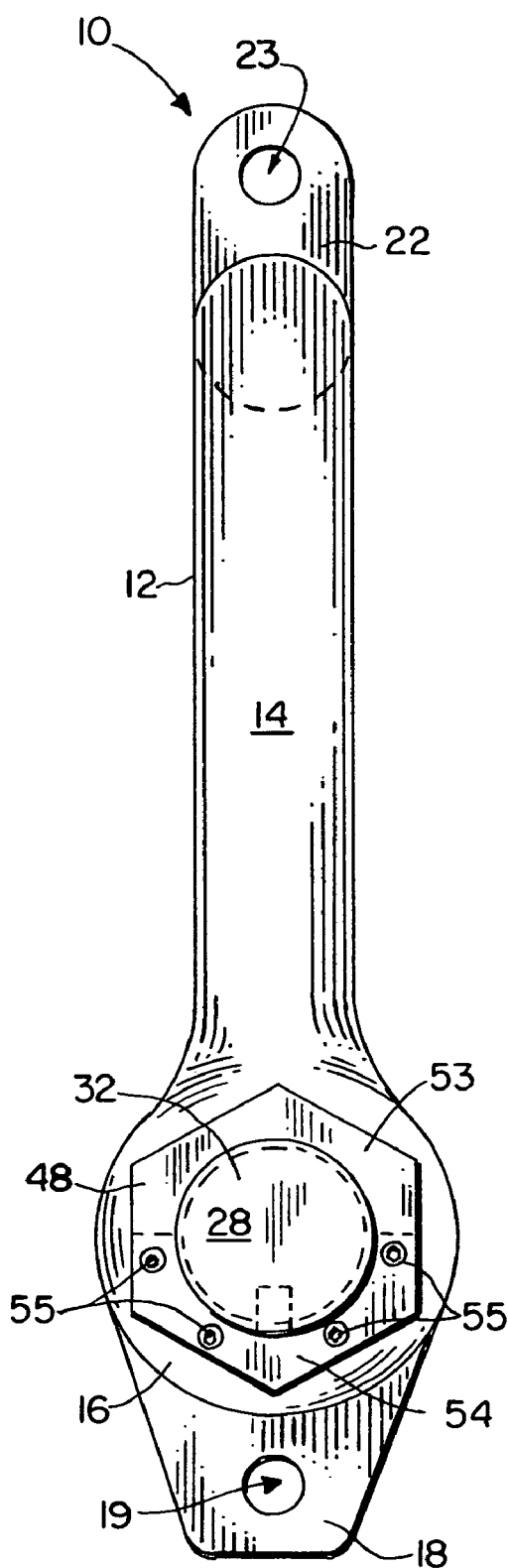
FIG. 2 is a sectional view taken along lines 2-2 of FIG. 1.
Figure 3:
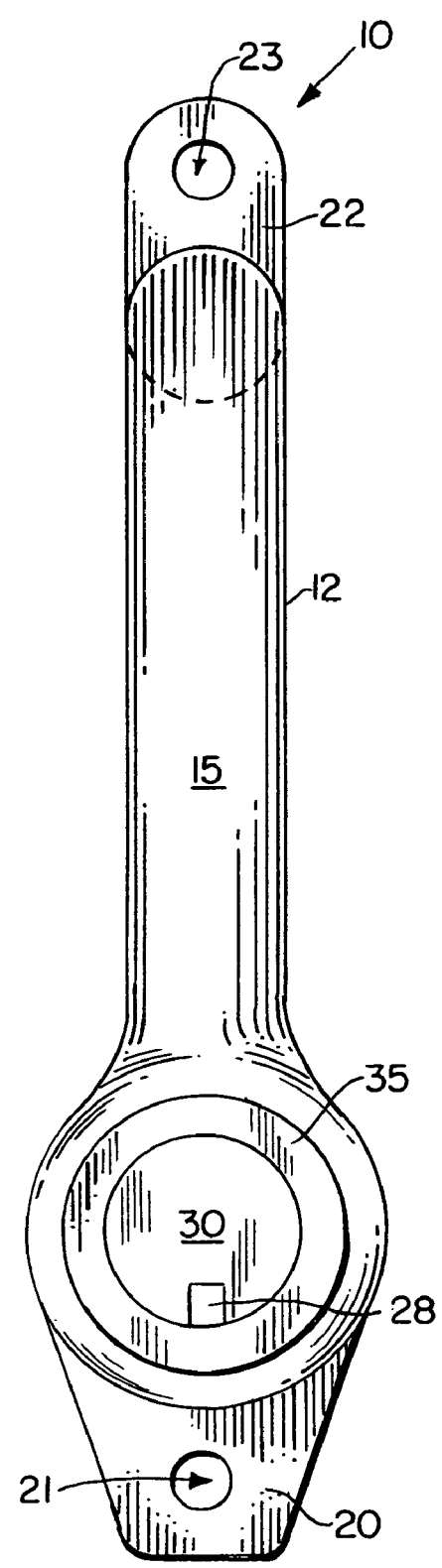
FIG. 3 is a sectional view taken along lines 3-3 of FIG. 1.
Figure 12:
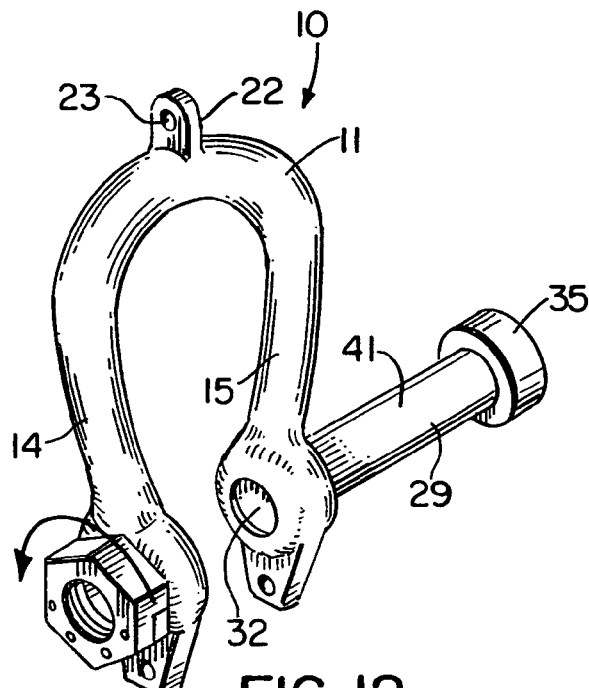
FIG. 12 is a perspective view of the preferred embodiment of the apparatus of the present invention.
Figure 13:
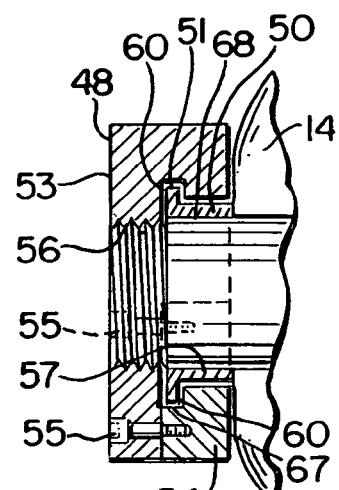
FIG. 13 is a partial sectional elevation view of the preferred embodiment of the apparatus of the present invention.

Shackle apparatus 10 includes a shackle body 11 that is generally u-shaped as shown in the drawings. The shackle body includes a bow portion 12 and a pair of spaced apart arms 14, 15. Each arm 14, 15 has an arm free end 16, 17 respectively.

Each arm 14, 15 provides an opening through which shackle pin 29 extends. Pin 29 is used to secure a particular item (sling, shackle, loop, wire rope or the like) to the shackle bow 12 (see FIGS. 14-16). Pin 29 and bow 12 surround opening 13.

A plurality of lifting eyes 18, 20, 22 are provided on shackle body 11. The lifting eyes 18, 20, 22 preferably include lifting eye 18 at the free end 16 of arm 14 and lifting eye 20 at the free end 17 of arm 15. Each lifting eye 18, 20 provides an opening. Lifting eye 18 has opening 19. Lifting eye 20 has opening 21. A third lifting eye 22 is provided on bow portion 12 of shackle body 11 generally opposite ends 16, 17. Lifting eye 22 has opening 23. Reference line 24 is a line that extends through lifting eye 22 and is equal distance from arms 14, 15 as shown in FIG. 1. Reference line 25 is a reference line that extends through the central axis of openings of pin 26, 27. The reference lines 24, 25 form an angle of about 90 degrees.

A first opening 26 is provided through arm 14 of shackle body 11 next to end 16. Second opening 27 is provided on arm 15 of shackle body 11 next to end 17. Each of the openings 26, 27 are preferably not threaded and are generally cylindrically shaped to conform generally to the outer surface 41 of pin 29.

Rib 28 is attached to arm 15 next to opening 27. Rib 28 extends only a partial distance through opening 27. Pin 29 has ends 30, 32 and externally threaded sections 33, 34. Rib 28 on arm 15 at opening 27 engages elongated keyway notch or groove 31 in pin 29. Groove 31 extends from end 30 of pin 29 to the beginning of externally threaded section 34 (see FIG. 9). In this fashion, the pin 31 is retained in opening 27 by rib 28.

Each of the ends 30, 32 of pin 29 are preferably externally threaded. Pin 29 thus provides externally threaded section 33 at end 30 and externally threaded section 34 at end 32 as shown in FIG. 9. Head 35 is attached to pin 29 at externally threaded section 33. Head 35 can be cylindrically shaped as shown in FIGS. 4 and 8, providing an internal cylindrically shaped bore having internally threaded section 36 (FIG. 8). Groove 37 extends axially through the bore of head 35, communicating with internally threaded section 36 as shown in FIGS. 4 and 8. Before use, head 35 is mounted permanently to pin 29. This is accomplished by threading head 35 upon pin 32 at externally threaded section 33 so that the threads of sections 33, 36 are fully engaged. Groove 31 is aligned with groove 37. Key 47 is then placed into the aligned grooves 31, 37. Key 47 is held in this position with set screw 45. Set screw 45 engages internally threaded opening 46 so that the set screw can frictionally engage the key 47 and hold it in position.

Once the key 47 and set screw 45 are engaged, head 35 cannot be removed from pin 29. Prior to attachment of pin 29 to head 35, pin 29 is placed through opening 26 and then 27 of shackle body 11. At this time, the groove 31 of pin 29 engages rib 28 on shackle body 11 at opening 27 as shown in FIGS. 4 and 7. Pin 29 can then be extended to the position shown in FIG. 10, wherein end 32 of pin 29 is next to the inside surface 62 of arm 15 at a position next to opening 27.

Figure 14:
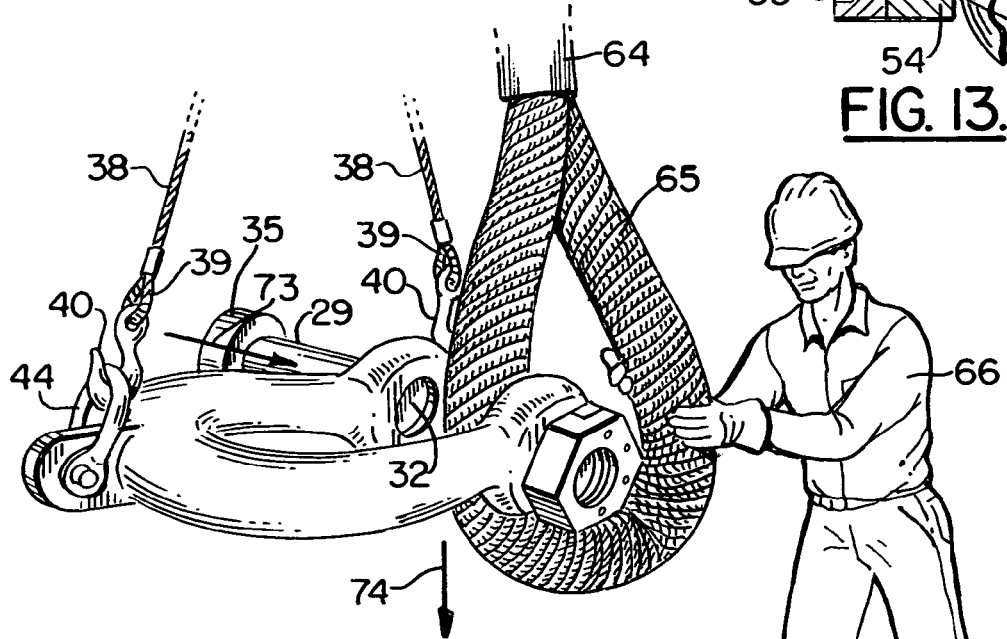
FIG. 14 is a perspective view of the preferred embodiment of the apparatus of the present invention illustrating connection of the shackle to a large lifting line.

In the position of FIG. 10, a gap 63 is provided between the inside surfaces 61, 62 of arms 14, 15 of shackle body 11. This gap enables a sling 64 with eyelet 65 to be attached to the shackle 10 for heavy lifting such as salvage operations (see FIGS. 14, 15, 16). As can be seen in FIG. 14, such a heavy lifting sling 64 can be as large as the worker 66 shown in the drawing. In order to close the shackle, the pin 29 is urged toward inside surface 61 and arm 14 until it engages opening 26. Opening 26 is not threaded so that end 32 and threaded section 34 can pass completely through opening 26 and engage nut 48.

Nut 48 is rotatably mounted upon sleeve 49. In FIG. 6, sleeve 49 is comprised of cylindrically shaped section 50 and annular flange 51. Sleeve 49 provides sleeve opening 52 through which pin 29, end portion 32 passes before it engages nut 48.

Nut 48 is comprised of a larger section 53 and a smaller section 54. These two sections 53, 54 are connected together with fasteners 59 after the sections 53, 54 are mounted upon sleeve 49. Larger section 53 has an internally threaded section 56 with threads that are sized and shaped to engage and form a threaded connection with the externally threaded portion 34 of pin 29. Smaller section 54 has curved surface 57 that corresponds in shape with cylindrically shaped section of sleeve 49. Smaller section 54 has another curved surface 67 that corresponds in shape with annular flange 51.

Larger section 53 and smaller section 54 are connected together using a plurality of fasteners 55. Openings 58 in larger section 53 are unthreaded. Openings 59 in smaller section 54 are internally threaded and are receptive of threaded portions on fasteners 55. The assembled nut 48 provides an annular groove 60 that includes curved surface 67 of smaller section 54 and curved surface 68 of larger section 53.

Figure 15:
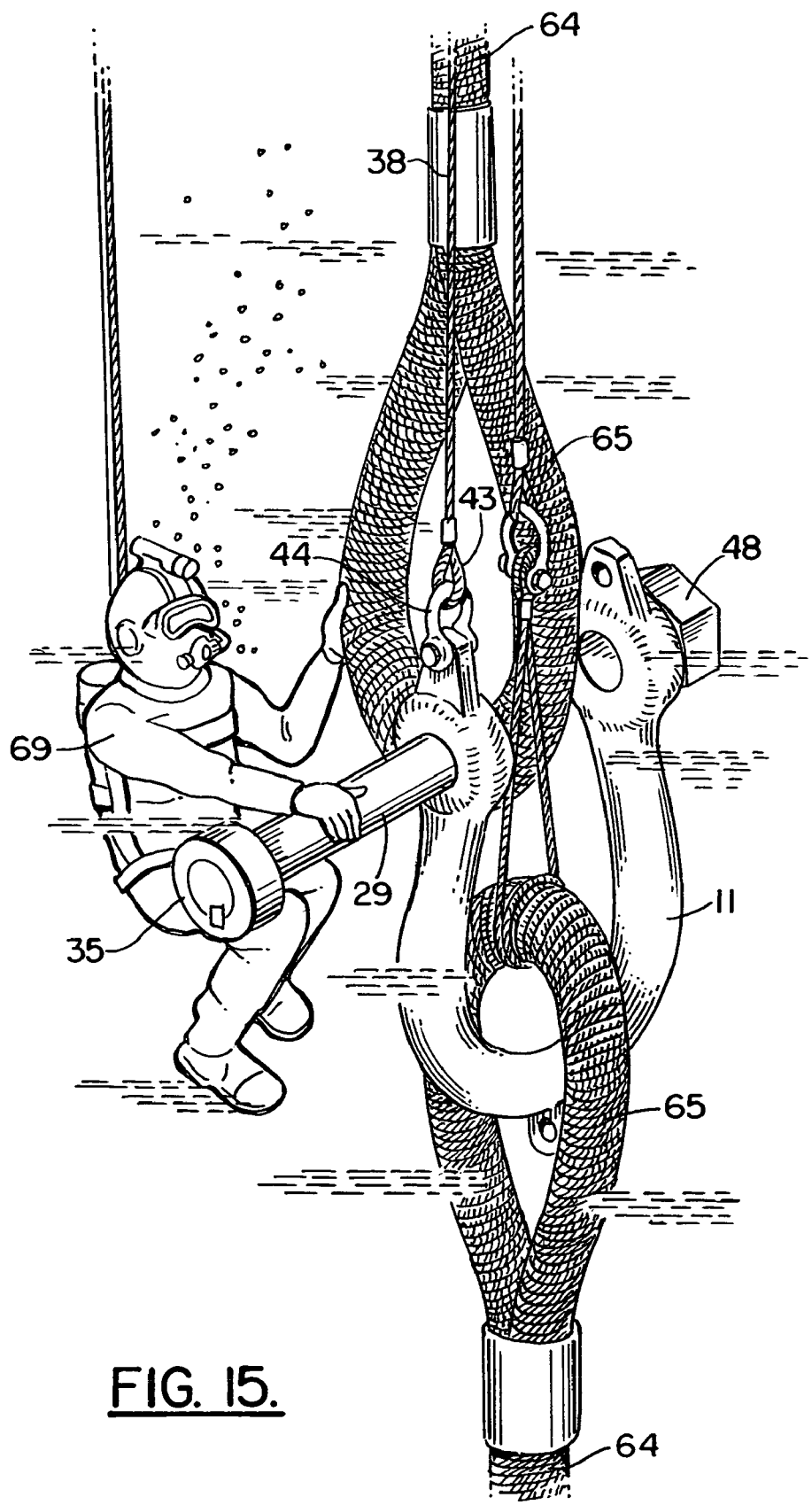
FIG. 15 is a perspective view of the preferred embodiment of the apparatus of the present invention illustrating connection of large lifting lines or slings to the shackle in an underwater environment.
Figure 16:
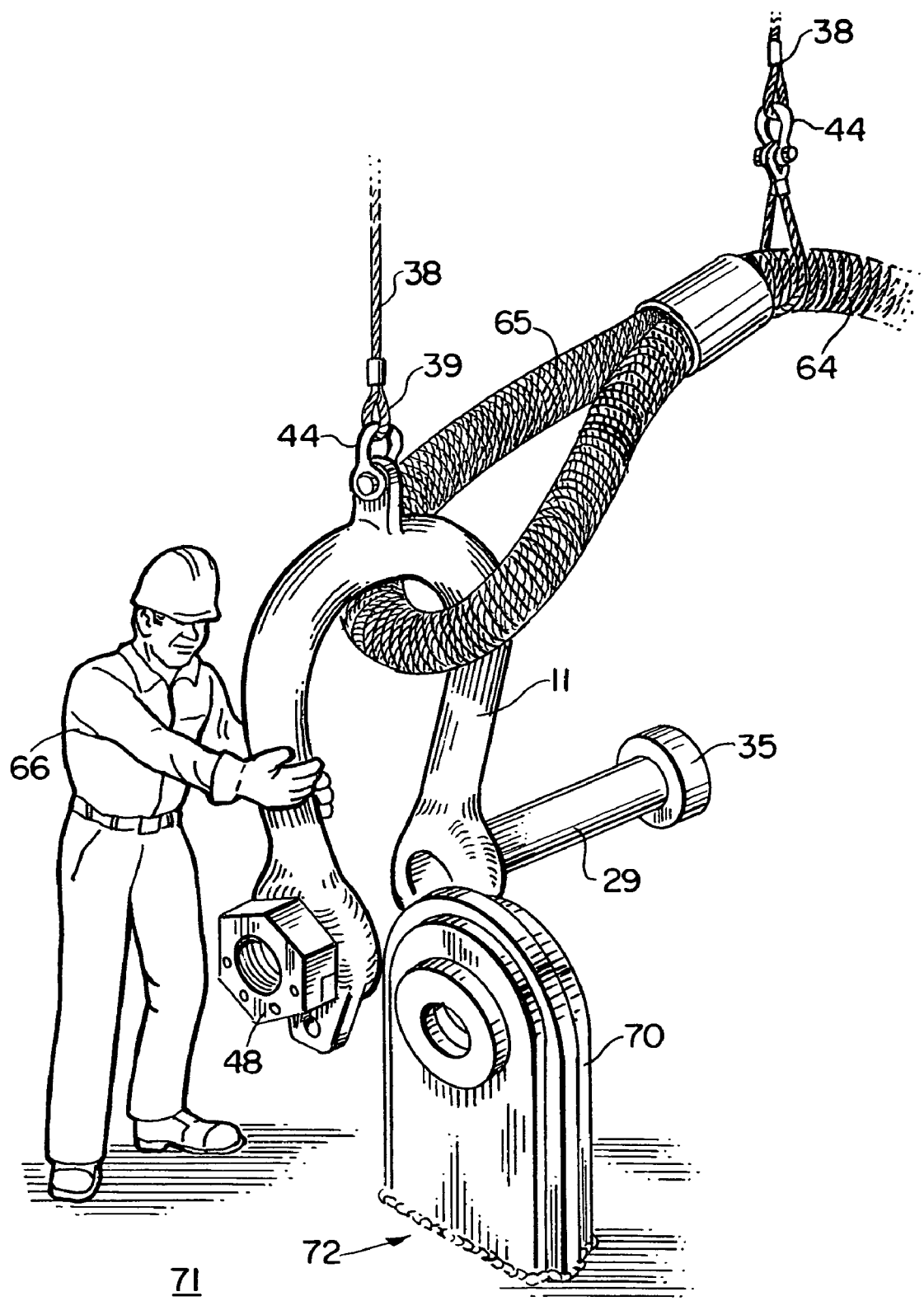
FIG. 16 is a perspective view of the preferred embodiment of the apparatus of the present invention illustrating connection to a padeye on a marine vessel.

In FIGS. 14, 15 and 16, one or more smaller slings 38 can be used to lift shackle 10 when it is to be preliminarily positioned for connection to a larger lifting line such as sling 65. Notice in FIG. 14, that the smaller slings 35 support the shackle 10 and its pin 29 remains attached. Thus the worker 66 does not need to support nor manipulate shackle body 11 nor pin 29. Arrow 73 schematically illustrates movement of pin 29 to a closed position. Arrow 74 shows the resultant shift for weight that is carried by small slings 38. The smaller slings 38 connect to eyelets 18, 20, 22 as shown in FIGS. 14, 15, 16. In FIG. 14, only two smaller slings 38 are used so that sling 65 can be slipped into opening 13. Smaller slings 38 can provide loop 39 end portions and hooks 40. In FIG. 15, a lifting line 42 has loop 43 and attaches to a selected eyelet 18, 20, 22 using one or more small shackles 44. In FIG. 15, a diver 69 is shown moving pin 29 to the closed position of FIGS. 1 and 11 when attaching two large lifting slings 64 to shackle 10. When in use underwater (FIG. 15) neither the nut 48 nor pin 29 can be lost as they are attached to body 11. The connected parts 11, 29, 48 provide a safe, stable platform for the diver 69 to hold on to. In FIG. 16, line 38 supports shackle 10 while forming a connection between large sling 64 and a padeye 70 of a marine vessel 71 on the vessel deck 72.

The shackle 10 of the present invention preferably has a very high load rating. For example, the present invention can have a working load limit of between about 50 and 1550 tons, or preferably between about 85 and 1250 tons.

The present invention can be used with very large wire rope lifting slings, having a cross-sectional diameter of between about 1 and 4 inches.

The present invention can be used with bundles of wire rope such as one and three quarter by nine bundles or two inch by nine bundles, these bundles having diameters as large between about 16 and 30 inches. The throat opening, indicated by arrow 75 in FIG. 1 can be between about one and three quarters and 18 inches.

The following is a list of parts and materials suitable for use in the present invention.

PARTS LIST

| Part Number | Description |
|---|---|
| 10 | shackle apparatus |
| 11 | shackle body |
| 12 | bow portion |
| 13 | eyelet |
| 14 | arm |
| 15 | arm |
| 16 | end |
| 17 | end |
| 18 | lifting eye |
| 19 | opening |
| 20 | lifting eye |
| 21 | opening |
| 22 | lifting eye |
| 23 | opening |
| 24 | reference line |
| 25 | reference line |
| 26 | first opening |
| 27 | second opening |
| 28 | rib |
| 29 | pin |
| 30 | end |
| 31 | groove |
| 32 | end |

-continued
PARTS LIST

| Part Number | Description |
|---|---|
| 33 | externally threaded section |
| 34 | externally threaded section |
| 35 | head |
| 36 | internally threaded section |
| 37 | groove |
| 38 | sling |
| 39 | loop |
| 40 | hook |
| 41 | outer surface |
| 42 | lifting eye |
| 43 | eyelet |
| 44 | small shackle |
| 45 | set screw |
| 46 | internally threaded opening |
| 47 | key |
| 48 | nut |
| 49 | sleeve |
| 50 | cylindrically shaped section |
| 51 | annular flange |
| 52 | opening |
| 53 | larger section |
| 54 | smaller section |
| 55 | fastener |
| 56 | internally threaded section |
| 57 | curved surface |
| 58 | opening |
| 59 | internally threaded opening |
| 60 | annular groove |
| 61 | inside surface |
| 62 | inside surface |
| 63 | gap |
| 64 | sling |
| 65 | eyelet |
| 66 | worker |
| 67 | curved surface |
| 68 | curved surface |
| 69 | diver |
| 70 | padeye |
| 71 | marine vessel |
| 72 | vessel deck |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A shackle, comprising:
    a) a generally u-shaped shackle body having a bow portion, and first and second end portions;
    b) each end portion having an unthreaded shackle pin opening;
    c) a shackle pin that is sized and shaped to simultaneously fit through the shackle pin openings, an end portion of the pin having external pin threads;
    d) a nut having an internally threaded opening, wherein the nut internally threaded opening and the second end portion pin opening have central axes that are aligned, the nut being rotatable mounted to the second end portion of the shackle body about said axes; and
    e) a connection of the pin to the nut being enabled by the external pin threads of the shackle pin engaging the internal threads of the nut when the nut is rotated relative to the body, and wherein when the pin is connected to the nut, the pin does not have to rotate relative to the shackle body.

2. The shackle of claim 1 wherein the shackle body and pin have alignment members that prevent rotation of the pin relative to the shackle body.

3. The shackle of claim 2 wherein the alignment members include a groove.

4. The shackle of claim 2 wherein the alignment members include a projection.

5. The shackle of claim 1 wherein the nut rotatably attaches to the shackle body at interlocking annular portions in the body and nut.

6. The shackle of claim 2 wherein the nut rotatably attaches to the shackle body at interlocking annular portions in the body and nut.

7. The shackle of claim 1 further comprising first and second lifting eyes on the shackle body that are positioned respectively next to the shackle body end portions.

8. The shackle of claim 7 further comprising a third eyelet on the shackle body on the bow portion, about equal distances from the first and second lifting eyes.

9. The shackle of claim 7 wherein each lifting eye is positioned so that when the shackle body is supported by a lifting eye, the shackle openings are aligned along a generally vertical path.

10. The shackle of claim 1 wherein the shackle ends have inside surfaces facing each other and outside surfaces.

11. The shackle of claim 10 wherein the nut is mounted to a shackle end outside surface.

12. The shackle of claim 1 wherein the nut is attached to the shackle body.

13. A shackle, comprising:
 a) a generally u-shaped shackle body having a bow portion, and first and second end portions;
 b) each end portion having an unthreaded shackle pin opening;
 c) a shackle pin that is sized and shaped to simultaneously fit through the shackle pin openings, at least one end portion of the pin having external pin threads;
 d) a nut having an internally threaded opening, the nut being rotatably mounted to the second end portion of the shackle body;
 e) the external pin threads of the shackle pin being configured to connect with the internal threads of the nut, and wherein when the pin is connected to the nut, the pin does not have to rotate relative to the shackle body; and
 f) the pin and shackle body being connected together so that when the internal and external threads are engaged and the nut rotated, the nut tightens upon the pin securing the pin to the shackle body and nut.

14. The shackle of claim 13 wherein the alignment members include a projection.

15. The shackle of claim 13 wherein the nut attaches to shackle body at interlocking annular portions in the body and nut.

16. The shackle of claim 13 wherein the nut is comprised of two separate sections that are connected together.

17. The shackle of claim 13 further comprising first and second lifting eyes on the shackle body that are positioned respectively next to the shackle body end portions.

18. The shackle of claim 17 further comprising a third eyelet on the shackle boy on the bow portion, about equal distances from the first and second lifting eyes.

19. The shackle of claim 17 wherein each lifting eye is positioned so that when the shackle body is supported by a lifting eye, the shackle openings are aligned along a generally vertical path.

20. The shackle of claim 13 wherein the shackle ends have inside surfaces facing each other and outside surfaces.

21. The shackle of claim 20 wherein the nut is mounted to a shackle end outside surface.

22. A method for salvaging multi-ton objects located in an underwater marine environment, comprising the steps of:
 a) providing a lifting device;
 b) connecting the lifting device to the object to be salvaged while underwater with rigging;
 c) wherein in step "b" the rigging includes a shackle that is comprised of:
  i) a generally u-shaped shackle body having a bow portion, and first and second end portions;
  ii) each end portion having an unthreaded shackle pin opening;
  iii) a shackle pin that is sized and shaped to simultaneously fit through the shackle pin openings, an end portion of the pin having external pin threads;
  iv) a nut having an internally threaded opening, the nut being rotatably mounted to the second end portion of the shackle body; and
  v) the external pin threads of the shackle pin being configured to connect with the internal threads of the nut, and wherein when the pin is connected to the nut, the pin does not have to rotate relative to the shackle body.

23. A method for salvaging multi-ton objects located in an underwater marine environment, comprising the steps of:
 a) providing a lifting device;
 b) providing rigging to connect the lifting device to the object to be salvaged while underwater;
 c) wherein in step "b" the rigging includes a shackle that is comprised of:
  i) a generally u-shaped shackle body having a bow portion, and first and second end portions;
  ii) each end portion having an unthreaded shackle pin opening;
  iii) a shackle pin that is sized and shaped to simultaneously fit through the shackle pin openings an end portion of the pin having external pin threads;
  iv) a nut having an internally threaded opening, the nut being rotatably mounted to the second end portion of the shackle body;
  v) the external pin threads of the shackle pin being configured to connect with the internal threads of the nut, and wherein when the pin is connected to the nut, the pin does not have to rotate relative to the shackle body; and
  vi) the pin and shackle body being connected together so that when the internal and external threads are engaged and the nut rotated, the nut tightens upon the pin securing the pin to the shackle body and nut.

24. A shackle, comprising:
 a) a generally u-shaped shackle body having a body interior and first and second free end portions;
 b) each free end portion having an unthreaded shackle pin opening and inner and outer surfaces, the inner surfaces communicating with the interior of the body;
 c) a shackle pin that is sized and shaped to fit through both of the shackle pin openings, a first end of the shackle pin having an enlarged cylindrically shaped annular member that is larger than the diameter of the pin and a second end being an externally threaded portion;
 d) the shackle pin being movable relative to the shackle body between open and closed positions;
 e) a nut having an internally threaded opening, the nut being rotatably mounted to the second end portion of the shackle body;

f) the externally threaded portion of the shackle pin enabling a threaded connection to be made with the internal threads of the nut defining the closed position; and g) wherein the pin is diconnectable from the nut and movable to the open position which places the second end of the pin next to the first end portion of the shackle body and spaced laterally away from the nut.

25. The shackle of claim 24 wherein the shackle body and pin have alignment members that prevent rotation of the pin relative to the shackle body.

26. The shackle of claim 24 wherein the alignment members include a groove.

27. The shackle of claim 24 wherein the alignment members include a projection.

28. The shackle of claim 24 wherein the nut attaches to shackle body at interlocking annular portions on the body and nut.

29. The shackle of claim 24 wherein the nut has an annular groove and the shackle body has an annular projecting part, the nut attached to the shackle body with the annular groove registering with the annular projecting part.

30. The shackle of claim 24 further comprising first and second lifting eyes on the shackle body that are positioned respectively next to the shackle body end portions.

31. The shackle of claim 30 further comprising a third eyelet on the shackle body that is spaced about equal distances from the first and second lifting eyes.

32. The shackle of claim 30 wherein each lifting eye is positioned so that when the shackle body is supported by a lifting eye, the shackle openings are aligned along a generally vertical path.

33. A shackle, comprising:

a) a generally u-shaped shackle body having a bow portion, and first and second end portions, each end portion having an inner surface and an outer surface;

b) each end portion having an unthreaded shackle pin opening with a common central axis;

c) a shackle pin that is sized and shaped to simultaneously fit through the shackle pin openings, a first end portion having an enlarged collar that will not fit through either pin opening, a second end portion of the pin opposite the collar having external pin threads;

d) a nut having an internally threaded opening that is positioned next to and generally aligned with a pin opening axis, the nut being rotatably mounted to the outer surface of the second end portion of the shackle body with interlocking annular portions on the body and nut; and e) a connection of the pin second end to the nut being enabled by the external pin threads of the shackle pin engaging the internal threads of the nut and wherein the nut can be rotated relative to the body, and wherein when the pin is connected to the nut, the pin does not have to rotate relative to the shackle body.

34. The shackle of claim 33 wherein the shackle body and pin have alignment members that prevent rotation of the pin relative to the shackle body.

35. The shackle of claim 33 wherein the nut rotatably attaches to the shackle body at interlocking annular portions in the body and nut.

36. The shackle of claim 33 further comprising first and second lifting eyes on the shackle body that are positioned respectively next to the shackle body end portions.

37. The shackle of claim 36 further comprising a third eyelet on the shackle body on the bow portion, about equal distances from the first and second lifting eyes.

38. The shackle of claim 36 wherein each lifting eye is positioned so that when the shackle body is supported by a lifting eye, the shackle openings are aligned along a generally vertical path.

39. The shackle of claim 33 wherein the shackle ends have inside surfaces facing each other and outside surfaces.

40. The shackle of claim 36 wherein the nut is mounted to a shackle end outside surface.

* * * * *